(No Model.)
E. W. PARNELL & J. SIMPSON.
AMMONIA SODA PROCESS.
No. 343,673. Patented June 15, 1886.
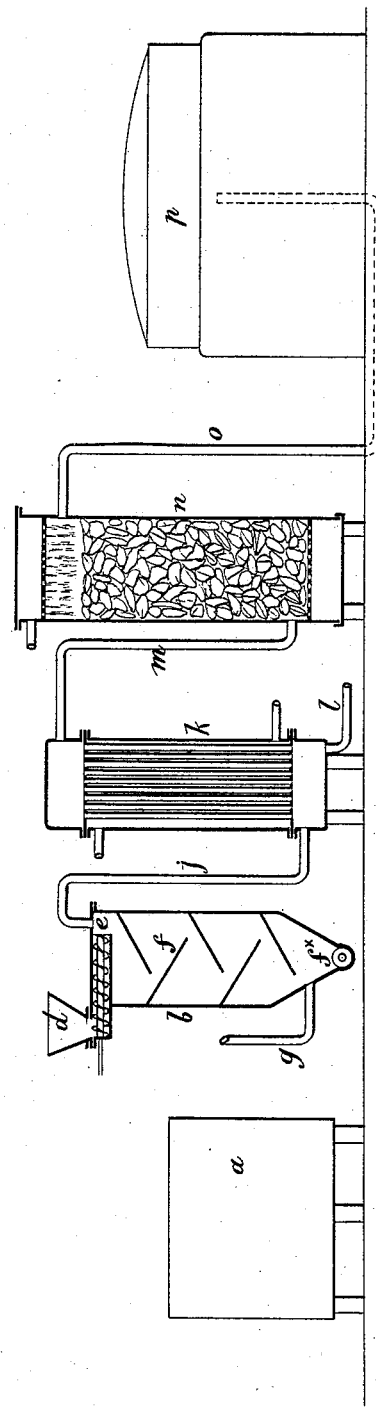
Witnesses
Inventors

UNITED STATES PATENT OFFICE.

EDWARD WILLIAM PARNELL AND JAMES SIMPSON, OF LIVERPOOL, COUNTY OF LANCASTER, ENGLAND.

AMMONIA-SODA PROCESS.

SPECIFICATION forming part of Letters Patent No. 343,673, dated June 15, 1886.

Application filed October 10, 1885. Serial No. 179,521. (No specimens.) Patented in England January 12, 1885, No. 381; in France February 16, 1885, No. 167,064; in Belgium February 18, 1885, No. 67,934; in Germany February 25, 1885, No. 33,255, and in Austria October 1, 1885, No. 19,765.

*To all whom it may concern:*

Be it known that we, EDWARD WILLIAM PARNELL and JAMES SIMPSON, subjects of the Queen of Great Britain, and residents of Liverpool, in the county of Lancaster, England, having invented a certain new and useful process for utilizing alkali waste from the Le Blanc process in the ammonia-alkali process, (for which we have obtained Letters Patent of Great Britain, No. 381, January 12, 1885; France, No. 167,064, February 16, 1885; Belgium, No. 67,934, February 18, 1885; Germany, No. 33,255, February 25, 1885; Austria, No. 19,765, October 1, 1885, and nowhere else;) and we do hereby declare that the following is a full, clear and exact description of the invention, which will enable those skilled in the art to which it appertains to make and use the same.

In the manufacture of carbonate of soda by means of ammonia, carbonic acid, and chloride of sodium, commonly known as the "ammonia-soda" or "ammonia-alkali" process, chloride of ammonium is produced, and considerable expense is incurred by the use of lime for liberating the ammonia for repeated use.

Now, the object of our invention is so to improve the ammonia process for the manufacture of carbonate of soda that by the agency of a comparatively valueless material time is saved and a valuable product obtained, in addition to an ammonium-salt suitable for repeated use in the said ammonia-alkali process.

The invention consists, essentially, in subjecting chloride of ammonium, which is formed during the conversion of the chloride of sodium into carbonate of soda, to the action of alkali waste from Le Blanc process, or to the drainage thereof, commonly called "yellow liquor," and subsequently using the sulphide of ammonium thereby produced for admixture with a solution of chloride of sodium or brine in the ammonia-alkali process, and collecting and utilizing the sulphureted hydrogen evolved during the reactions above mentioned.

Our invention may advantageously be carried into practice as follows: The alkali waste or yellow liquor is mixed with a solution of chloride of ammonium produced in the ammonia-alkali process, and the mixture is heated in a closed vessel to a temperature of 212° Fahrenheit, or thereabout. During this treatment decomposition takes place and chloride of calcium is formed in solution, while sulphide of ammonium and steam are given off. The gaseous products or vapors are not given off entirely in the form of steam and combined sulphide of ammonium, those which are first evolved containing an excess of sulphureted hydrogen, while ammonia predominates at the final stage. We therefore prefer to collect the said sulphureted hydrogen in the manner hereinafter described, rather than allow it to be absorbed by coming in contact with the uncombined portion of the ammonia.

In order to avoid loss of ammonia, it is advisable to employ a slight excess of waste, before running off the residue of one or more of a series of operations.

Sulphide-of-ammonium vapor may also be obtained by mixing the waste or yellow liquor with chloride of ammonium at ordinary atmospheric temperature and boiling the resulting solution of chloride of calcium and sulphide of ammonium; but this is somewhat inconvenient. The sulphide-of ammonium vapor, or mixture of ammonia and sulphide of ammonium, obtained as above set forth, is absorbed or condensed in water or brine, and is employed for the manufacture of carbonate of soda in the same manner as free ammonia alone is ordinarily employed in the manufacture of carbonate of soda by the ammonia-alkali process. The chloride of ammonium formed in this reaction is again mixed with waste and used repeatedly, as before. The sulphur which passes into the absorbing-plant with the ammonia in the form of sulphide of ammonium is liberated in combination with hydrogen, and after washing with an acid solution to arrest any traces of ammonia is burned or dealt with by any of the known methods for the manufacture of sulphur or its compounds—such as vitriol—from sulphureted hydrogen.

If dilute carbonic-acid gas be employed for the manufacture of carbonate of soda, it is manifest that the sulphureted hydrogen given off from the absorbing-plant will be correspondingly weak, and under certain circumstances may, from this cause, be unsuitable for the manufacture of vitriol with convenience and economy. We therefore prefer to employ carbonic acid of greater purity or strength than that ordinarily obtained from limekilns, through which a current of air is allowed to pass, which strong carbonic acid may be obtained in various ways—for example, as by heating limestone in retorts without access of air and adding thereto water-spray or steam; but where such supply of strong carbonic acid is not available we can obtain a large proportion of the sulphur originally contained in the waste in the form of strong sulphureted hydrogen by employing the solution of chloride of ammonium in a dilute form and keeping same in excess of the waste up to the last charge in a series of operations. It will then be necessary to have the waste slightly in excess to prevent loss by ammonia remaining in the liquor from previous charges, as previously stated. When a dilute solution of chloride of ammonium in excess is employed, a considerable amount—say fifty per cent.—of the sulphur will be given off at an early stage of the decomposition of the waste, in combination with hydrogen instead of with ammonia, and before the latter is evolved, later on sulphide of ammonium will be given off, and finally free ammonia. By passing these vapors or gases as evolved into a condensing apparatus in which a quantity of water is maintained at a low temperature the sulphureted hydrogen which is given off at the early stage of the decomposition will pass through, and after being washed in acid solution to arrest any traces of ammonia may be conducted to a gasometer or other suitable receptacle and employed for the manufacture of sulphur or sulphur compounds—such as vitriol—by any of the well-known methods for dealing with sulphureted hydrogen, while the sulphide of ammonium and ammonia which are given off at a later stage will be condensed or absorbed by the water in the condenser and will be available for the manufacture of carbonate of soda by the ammonia-alkali process, as hereinbefore set forth. The passage between the condenser and the gasometer should be fitted with water locks or valves to prevent the sulphureted hydrogen from passing backward.

In order that our invention may be clearly understood, we have appended hereto a drawing indicating an arrangement of apparatus suitable for carrying our invention into practice.

A represents a black-ash vat or tank from which the waste is transferred into a vessel, $b$, through a hopper, $d$, by means of a worm, $e$, the vessel having shelves down which the waste slides or moves until it reaches the bottom of the vessel, when it is removed by the endless worm $f$. Steam is introduced into the vessel $b$ through a pipe, $g$, to heat the mixed mass until decomposition takes place, and sulphide of ammonium mixed with sulphureted hydrogen and steam is given off, passing through a pipe, $j$, leading from the vessel $b$ to the condenser $k$, through which the sulphureted hydrogen will pass, the sulphide-of-ammonium and water vapor being condensed and drawn off through a pipe, $l$, and led to ammonia-alkali plant, to be used in lieu of gaseous ammonia. The sulphureted hydrogen, after leaving the condenser, passes through a pipe, $m$, in the washing-tower $n$, where the last traces of ammonia are removed. The purified sulphureted hydrogen is conducted through the pipe $o$ to the gasometer $p$, whence it is drawn as required to be utilized in any convenient manner.

It will be obvious that in conducting the operations herein set forth the construction of the various parts of the apparatus may be varied to a large extent to suit individual requirements.

It is manifest that if a works be designed to manufacture carbonate of soda in about equal quantities by the above process and by the Le Blanc process, respectively, the sulphur required by the latter process may be recovered for repeated use, or for sale, by means of the chloride of ammonia of the former process, so that the expense of removing the alkali waste would be avoided and an offensive nuisance be almost entirely obviated. The lime also, which is produced in the kilns or retorts for supplying carbonic acid in the ammonia-alkali process, will be available for the manufacture of bleaching-powder or caustic soda, and if vitriol be made from the sulphureted hydrogen, it can either be sold on account of its purity, or employed for the manufacture of sulphate of soda and production of hydrochloric acid.

What we claim, and desire to secure by Letters Patent, is—

1. The herein-described process in the ammonia-alkali process, consisting in mixing the chloride of sodium produced therein with the waste or waste drainage of the Le Blanc process, and subsequently employing the sulphide of ammonia so produced for admixture with the chloride-of-sodium solution in the ammonia-alkali process, and collecting and utilizing the sulphureted hydrogen produced in said reactions, substantially as and for the purposes specified.

2. In the ammonia-alkali process, mixing the chloride of ammonium produced therein with waste or waste drainage from the Le Blanc process, and employing the sulphide of ammonium formed or evolved with chloride of sodium in the absorbing-plant of the ammonia-alkali process.

3. In the ammonia-alkali process, mixing the chloride of ammonium produced therein with waste or waste drainage from the Le Blanc process, and employing the sulphide of ammonium formed or evolved, together with the chloride of sodium and carbonic acid in the absorbing-plant of the ammonia-alkali process.

4. In the ammonia-alkali process, mixing the chloride of ammonium produced therein with waste or waste drainage from the Le Blanc process, and subsequently collecting and utilizing the sulphureted hydrogen evolved.

5. In the ammonia-alkali process, heating alkali waste from the Le Blanc process with an excess of a dilute solution of the chloride of ammonium produced in the ammonia-alkali process, for the purpose of obtaining a large portion of the sulphur in the form of sulphureted hydrogen, in the manner described.

6. In the ammonia-alkali process, separating sulphureted hydrogen produced from chloride of ammonium and alkali waste from the Le Blanc process, as above described, from ammonia and sulphide of ammonium by passing the gases or vapors of the said substances into a condensing apparatus and conducting the sulphureted hydrogen to a gasometer or other receptacle, substantially as described.

E. W. PARNELL.
JAMES SIMPSON.

Witnesses:
    JOHN MORROW,
8ª *Rumford Place, Liverpool, merchant.*
    E. J. CAPE,
8ª *Rumford Place, Liverpool, book-keeper.*